United States Patent
Cho et al.

(10) Patent No.: US 7,316,261 B2
(45) Date of Patent: Jan. 8, 2008

(54) HEAT EXCHANGING SYSTEM OF VENTILATING DEVICE

(75) Inventors: Min-Chul Cho, Busan (KR); Soo-Yeon Shin, Kyungsangnam-Do (KR); Seong-Hwan Lee, Kyungsangnam-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/537,311

(22) PCT Filed: Dec. 6, 2002

(86) PCT No.: PCT/KR02/02298

§ 371 (c)(1),
(2), (4) Date: Jun. 2, 2005

(87) PCT Pub. No.: WO2004/053409

PCT Pub. Date: Jun. 24, 2004

(65) Prior Publication Data

US 2006/0054302 A1    Mar. 16, 2006

(51) Int. Cl.
*F23L 15/02* (2006.01)
*F28F 25/10* (2006.01)
*F24H 3/02* (2006.01)

(52) U.S. Cl. .................. 165/8; 165/4; 165/66; 165/85

(58) Field of Classification Search ............ 165/4, 165/6, 8, 9.4, 10, 66, 85, 86, 122
See application file for complete search history.

(56) References Cited

U.S. PATENT DOCUMENTS

| | | | | |
|---|---|---|---|---|
| 1,697,591 A | * | 1/1929 | Dowd, Jr. ............... | 165/6 |
| 2,802,646 A | * | 8/1957 | Jetter .................... | 165/8 |
| 3,978,912 A | * | 9/1976 | Penny et al. ............ | 165/4 |
| 4,000,775 A | * | 1/1977 | Eisenstein .............. | 165/8 |
| 4,084,633 A | * | 4/1978 | Strindehag ............. | 165/8 |
| 4,513,809 A | | 4/1985 | Schneider et al. | |
| 4,688,626 A | * | 8/1987 | Tengesdal .............. | 165/4 |
| 4,711,293 A | * | 12/1987 | Niwa et al. ............. | 165/4 |
| 4,852,642 A | * | 8/1989 | Lee ..................... | 165/109.1 |
| 5,050,667 A | * | 9/1991 | Berner et al. ........... | 165/4 |
| 5,238,052 A | * | 8/1993 | Chagnot ................ | 165/8 |
| 5,826,641 A | * | 10/1998 | Bierwirth et al. ....... | 165/48.1 |

FOREIGN PATENT DOCUMENTS

DE    27 17 203 A1    10/1978
EP    1 148 303 A2    10/2001

* cited by examiner

*Primary Examiner*—Tho Duong
(74) *Attorney, Agent, or Firm*—Birch, Stewart, Kolasch & Birch, LLP

(57) ABSTRACT

A heat exchanging system of a ventilating device includes: a heat exchanging housing communicating with an outdoor air passage and an indoor air passage; a rotational shaft rotatably supported at one side of the case of a ventilating device; and a heat exchanging elements mounted at an outer circumferential surface of the rotational shaft at regular intervals, and performing a heat-exchanging operation of outdoor air and indoor air while being rotated by a wind force of outdoor air passing the outdoor air passage and a blow force of indoor air passing the indoor air passage. Thus, any additional driving unit is not necessary to rotate the heat exchanging system, so that a fabrication cost can be reduced, the overall size of the ventilating device can be reduced, and a noise and vibration can be reduced.

13 Claims, 2 Drawing Sheets

HEAT EXCHANGING SYSTEM OF VENTILATING DEVICE

TECHNICAL FIELD

The present invention relates to a ventilating device for ventilating a room by exchanging indoor air with outdoor air and, more particularly, to a heat exchanging system of a ventilating device that is capable of heat-exchanging indoor air being discharged to the outside of a room and outdoor air being supplied into the room in ventilating.

BACKGROUND ART

In general, a ventilating device discharges contaminated indoor air to the outside of a room and sucks an outdoor fresh air into the room, having an air purifier for removing dusts and foreign materials contained in the outdoor air and a heat exchanging system for transmitting heat of the indoor air being discharged to the outside of the room to the outdoor air being sucked into indoors.

FIG. 1 is a sectional view of the ventilating device in accordance with a conventional art, and FIG. 2 is a sectional view of a heat exchanging system taken along line I-I of FIG. 1 in accordance with the conventional art.

The conventional ventilating device includes: a case 102 mounted penetrating a wall compartmenting the outside and the inside of the room, having one side positioned at the outside and the other side positioned indoors; a heat exchanging system 104 rotatably mounted inside the case 102 and performing an heat-exchange operation between indoor air and outdoor air; and a driving unit mounted at one side of the case 102 and generating a driving force to rotate the heat exchanging system 104.

An outdoor air passage 108 for passing outdoor air therethrough and an indoor air passage 110 for passing indoor air therethrough are formed inside the case 102. An outdoor suction opening 112 for sucking outdoor air and an outdoor discharge opening 114 for discharging indoor air outwardly are formed at one side of the case 102 positioned at the outside of the room. An indoor suction opening 116 for sucking indoor air and an indoor discharge opening 118 for discharging outdoor air into the room are formed at the outer side of the case 102 positioned at the inside of the room.

A first blow fan 120 is installed in the outdoor air passage 108 to give a suction force to outdoor air to suck the outdoor air, and a second blow fan 124 is installed in the indoor air passage 110 to give a sucking force to suck the indoor air.

As shown in FIG. 2, the heat exchanging system 104 consists of a rotational shaft 130 rotatably supported at the center of the case 102, a hub 132 formed in a cylindrical form and fixed at the rotational shaft 130, and a heat exchanging elements 134 being radially mounted at the hub 132, sucking heat contained in indoor air being discharged to the outside of the room and transmitting it to outdoor air being sucked into the room.

The driving unit consists of a drive motor fixed at one side of the case 102, a drive pulley 142 connected to the drive motor 140, a passive pulley 144 fixed at the rotational shaft; and a belt 146 wound between the drive pulley 142 and the passive pulley 144.

The operation of the conventional ventilating device will now be described.

When an operation switch is turned on, the first blow fan 120 and the second blow fan 124 are driven, so that outdoor air is supplied into the room through the outdoor air passage 108 and indoor air is discharged outwardly through the indoor air passage 110.

When the rotational shaft 130 is rotated by the drive pulley 142, the belt 146 and the passive pulley 146 as the drive motor 140 is driven, the heat exchanging element 134 is rotated together with the hub 132, absorbing heat contained in the indoor air being discharged outwardly of the room and transmitting it to the outdoor air being sucked into the room.

However, since the heat exchanging system of the conventional ventilating device requires a driving unit for driving the heat exchanging system and a driving force transmitting unit for transmitting the driving force of the driving unit to the heat exchanging system, a fabrication cost is increased. In addition, since a space is required to install them, the ventilating device is enlarged in its size. Moreover, a noise and vibration are generated according to driving of the drive motor.

DISCLOSURE OF THE INVENTION

Therefore, it is an object of the present invention to provide a heat exchanging system of a ventilating device which is rotated by a wind force in the flow of indoor air and outdoor air, to thereby reduce a fabrication cost because no driving unit is required to drive the heat exchanging system, reduce the size of a ventilating device, and reduce a noise and vibration.

To achieve these objects, there is provided a heat exchanging system of a ventilating device including: a heat exchanging housing communicating with an outdoor air passage and an indoor air passage; a rotational shaft rotatably supported at one side of the case of a ventilating device; and a heat exchanging elements mounted at an outer circumferential surface of the rotational shaft at regular intervals, and performing a heat-exchanging operation of outdoor air and indoor air while being rotated by a blow force of outdoor air passing the outdoor air passage and a blow force of indoor air passing the indoor air passage.

In the heat exchanging system of a ventilating device of the present invention, a hub is formed at an outer circumferential surface of the rotational shaft, and an inner surface of the heat exchanging elements is mounted at the hub.

In the heat exchanging system of a ventilating device of the present invention, the heat exchanging elements are mounted at the outer circumferential surface of the hub at regular intervals and formed with a curved surface.

In the heat exchanging system of a ventilating device of the present invention, a support rib is mounted at an outer circumferential surface of the heat exchange element in order to support so that the heat exchanging elements are arranged at regular intervals.

In the heat exchanging system of a ventilating device of the present invention, the inner side of the curved heat exchanging elements faces the direction that outdoor air flows and the direction that indoor air flows.

In the heat exchanging system of a ventilating device of the present invention, the heat exchanging element is made of non-woven fabric.

MODES FOR CARRYING OUT THE PREFERRED EMBODIMENTS

There may exists a plurality of embodiments for a heat exchanging system of a ventilating device, of which most preferred one will now be described.

Figure 1:
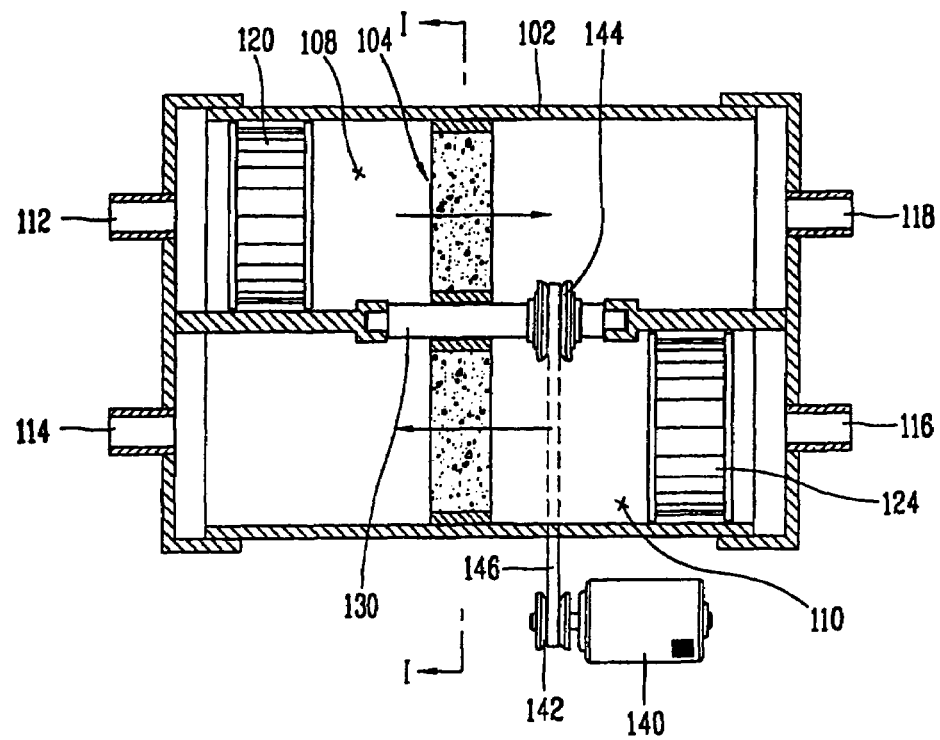
FIG. 1 is a sectional view of a ventilating device in accordance with a conventional art.
Figure 2:
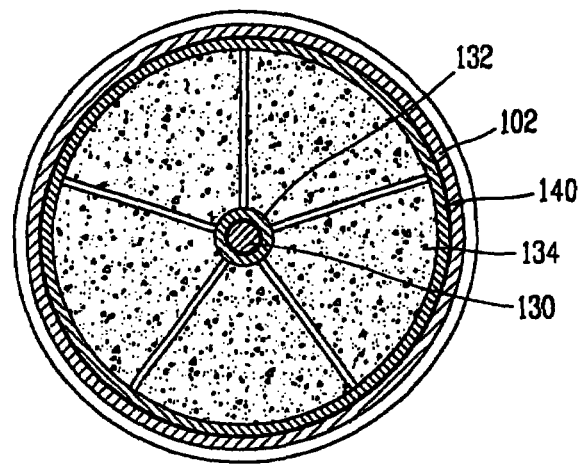
FIG. 2 is a sectional view of a heat exchanging system of the ventilating device taken along line I-I of FIG. 1 in accordance with the conventional art.
Figure 3:
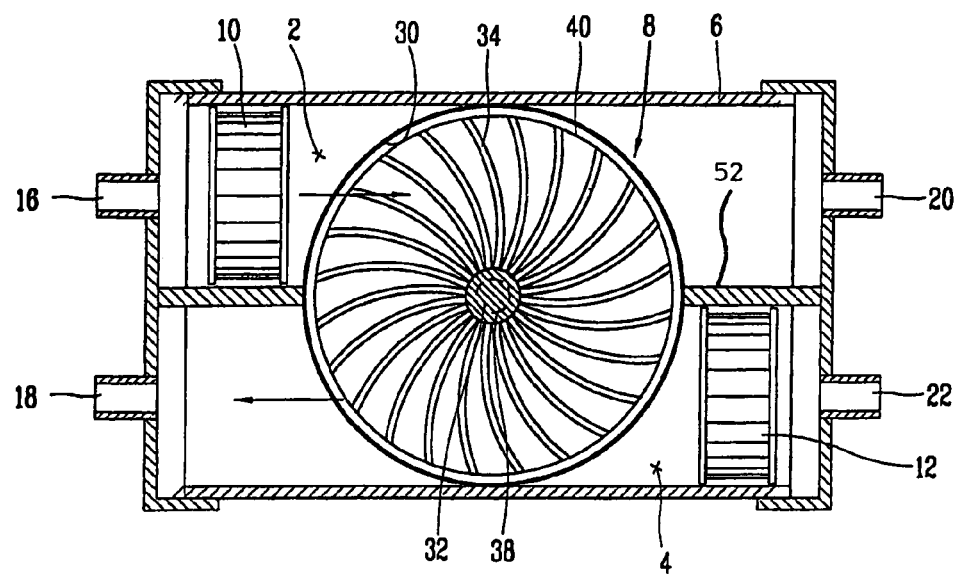
FIG. 3 is a sectional view of a ventilating device in accordance with the present invention.
Figure 4:
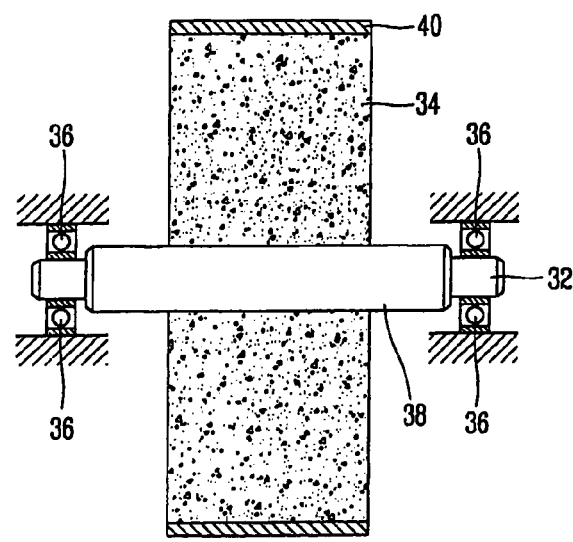
FIG. 4 is a sectional view of a heat exchanging system of the ventilating device in accordance with the present invention.

FIG. 3 is a sectional view of a heat exchanging system of the ventilating device in accordance with the present invention and FIG. 4 is a sectional view of a heat exchanging system of the ventilating device in accordance with the present invention.

As shown in FIG. 3, a ventilating device of the present invention includes: a case 6 mounted penetrating a wall which defines the indoors and the outdoors and having an outdoor air passage 2 for passing outdoor air therethrough and an indoor air passage 4 for passing indoor air therethrough; a heat exchanging system 8 rotatably mounted inside the case 6 and performing a heat exchanging operation on indoor air and outdoor air; and first and second blow fans 10 and 12 mounted at the outdoor air passage 2 and the indoor air passage 4 and providing a blow force, respectively.

The case 6 includes a partition wall 52 for dividing the outdoor air passage 2 and the indoor air passage 4.

At one side of the case 6 positioned outdoors, there are provided an outdoor suction opening 16 connected to the outdoor air passage 2 for sucking outdoor air and an outdoor discharge opening 18 connected to the indoor air passage 4 for discharging indoor air outwardly of a room.

Meanwhile at the other side of the case 6 positioned in the room, there are provided an indoor discharge opening 20 connected to the outdoor air passage 2 for discharging outdoor air into the room and an indoor suction opening 22 connected to the indoor air passage 4 for sucking indoor air therethrough.

The heat-exchanging system 8 consists of a heat exchanging housing 30 formed communicating between the outdoor air passage 2 and the indoor air passage 4; a rotational shaft 32 rotatably supported at one side of the case 6; and a plurality of heat exchanging elements 34 fixed at the rotational shaft 32, inserted in the heat exchanging housing 30, and performing a heat exchanging operation on indoor air and outdoor air while being rotated by a blow force of outdoor air and indoor air.

Both sides of the rotational shaft 32 are rotatably supported at one side of the case 6 and a bearing 36 is inserted between the case and the rotational shaft 32. A hub 38 is fixed at an outer circumferential surface of the rotational shaft 32, in which the inner surface of the heat exchanging element 34 is mounted. A support rib 40 is mounted at an outer surface of the heat exchanging elements 34 to support the outer surface of the heat exchanging elements 34.

The heat exchanging elements 34 are formed with a curved surface with a predetermined thickness and mounted at the outer circumferential surface of the hub 38 at equal intervals in a circumferential direction. The outer surface of the heat exchanging elements 34 are supported by the support rib 40.

That is, the heat exchanging elements 34 are formed such that the inner side of the curved surface faces the direction that indoor air and outdoor air flow and thus rotated by a wind force of the indoor air and the outdoor air.

The heat exchanging elements 34 is made of a material which would easily absorbs heat contained in indoor air and, preferably, formed of non-woven fabric.

The operation of the ventilating device constructed as described above will now be explained.

When a user turns on an operation switch of the ventilating device, the first and second blow fans 10 and 12 are driven. When the first blow fan 10 is driven, outdoor air is sucked into the outdoor suction opening 16, passes through the outdoor air passage 2 and is supplied into the room through the indoor discharge opening 20. Meanwhile, when the second blow fan 12 is driven, indoor air is sucked into the indoor suction opening 22, passes the indoor air passage 4 and is discharge outwardly of the room through the outdoor discharge opening 18.

At this time, when the outdoor air passing the outdoor air passage 2 and the indoor air passing the indoor air passage 4 collide with the front surface of the heat exchanging elements 34, respectively, the heat exchanging elements 34 are rotated centering around the rotational shaft 32.

When the indoor air collides with the heat exchanging elements 34, the heat exchanging elements 34 absorb heat contained in the indoor air, and then, when the outdoor air collides with the heat exchanging elements 34 while the heat exchanging elements 34, which have absorbed heat of the indoor air, are being rotated, the heat exchanging elements 34 transmits heat to the outdoor air, thereby performing a heat exchanging operation between the indoor air and the outdoor air.

As so far described, the heat exchanging system of a ventilating device of the present invention has the following advantages.

That is, the heat exchanging system is rotatably mounted between the outdoor air passage and the indoor air passage and rotated by a blow force of outdoor air passing the outdoor air passage and a blow force of indoor air passing the indoor air passage, thereby performing a heat exchanging operation. Thus, any additional driving unit is not necessary to rotate the heat exchanging system, so that a fabrication cost can be reduced, the overall size of the ventilating device can be reduced, and a noise and vibration can be reduced.

It will be apparent to those skilled in the art that various modifications and variations can be made in the plasma polymerization on the surface of the material of the present invention without departing from the spirit or scope of the invention. Thus, it is intended that the present invention cover modifications and variations of this invention provided they come within the scope of the appended claims and their equivalents.

The invention claimed is:

1. A ventilating device comprising:
  a housing having an outdoor air passage and an indoor air passage;
  a shaft rotatably supported by the housing, the shaft being rotatable about an axis which is substantially perpendicular to a direction of an air flow flowing in at least one of the outdoor air passage and the indoor air passage; and
  a plurality of heat exchanging elements mounted around an outer circumferential surface of the shaft, the heat exchanging elements being rotatable on the shaft by the air flow to exchange heat between air in the outdoor air passage and air in the indoor air passage, wherein a hub is formed at an outer circumferential surface of the shaft, in which an inner surface of the heat exchanging elements is mounted, wherein each of the heat exchanging elements has substantially a same curved shape.

2. The ventilating device of claim 1, wherein the heat exchanging elements are mounted at the outer circumferential surface of the hub at regular intervals.

3. The ventilating device of claim 1, wherein a support rib is mounted at an outer circumferential surface of the heat exchanging elements.

4. The ventilating device of claim 1, further comprising a heat exchanging housing within the housing to communicate with the outdoor air passage and the indoor air passage, the heat exchanging housing surrounding the heat exchanging elements.

5. The ventilating device of claim 1, wherein each of the heat exchanging elements has a concave surface.

6. The ventilating device of claim 5, wherein the air flow flows onto the concave surface to rotate the heat exchanging elements.

7. The ventilating device of claim 1, wherein the outdoor air passage is parallel to the indoor air passage.

8. The ventilating device of claim 1, wherein the axis is perpendicular to the direction of the air flow.

9. A ventilating device comprising:
a housing having an outdoor air passage and an indoor air passage;
a shaft rotatably supported by the housing, the shaft being rotatable about an axis which is substantially perpendicular to a direction of an air flow flowing in at least one of the outdoor air passage and the indoor air passage; and
a plurality of heat exchanging elements mounted around an outer circumferential surface of the shaft, the heat exchanging elements being rotatable on the shaft by the air flow to exchange heat between air in the outdoor air passage and air in the indoor air passage, wherein each of the heat exchanging elements has a concave surface and a convex surface opposite to the concave surface, wherein when the concave surface faces an inlet of one of the outdoor air passage and the indoor air passage, the convex surface faces an outlet of the one of the outdoor air passage and the indoor air passage.

10. The ventilating device of claim 9, wherein the heat exchanging element is made of non-woven fabric.

11. A ventilating device comprising:
a housing having an outdoor air passage and an indoor air passage;
a shaft rotatably supported by the housing, the shaft being rotatable about an axis which is substantially perpendicular to a direction of an air flow flowing in at least one of the outdoor air passage and the indoor air passage;
a plurality of heat exchanging elements mounted around an outer circumferential surface of the shaft, the heat exchanging elements being rotatable on the shaft by the air flow to exchange heat between air in the outdoor air passage and air in the indoor air passage;
a hub on the shaft; and
a support rib along an outer circumferential surface of the heat exchanging elements, each of the heat exchanging elements extending from the hub to the support rib, wherein each of the heat exchanging elements has substantially a same curved shape.

12. The ventilating device of claim 11, wherein each of the heat exchanging elements has a concave surface.

13. The ventilating device of claim 12, wherein the air flow flows onto the concave surface to rotate the heat exchanging elements.

* * * * *